(No Model.) 2 Sheets—Sheet 1.
J. C. MARTIN.
CONVEYING APPARATUS.
No. 399,150. Patented Mar. 5, 1889.
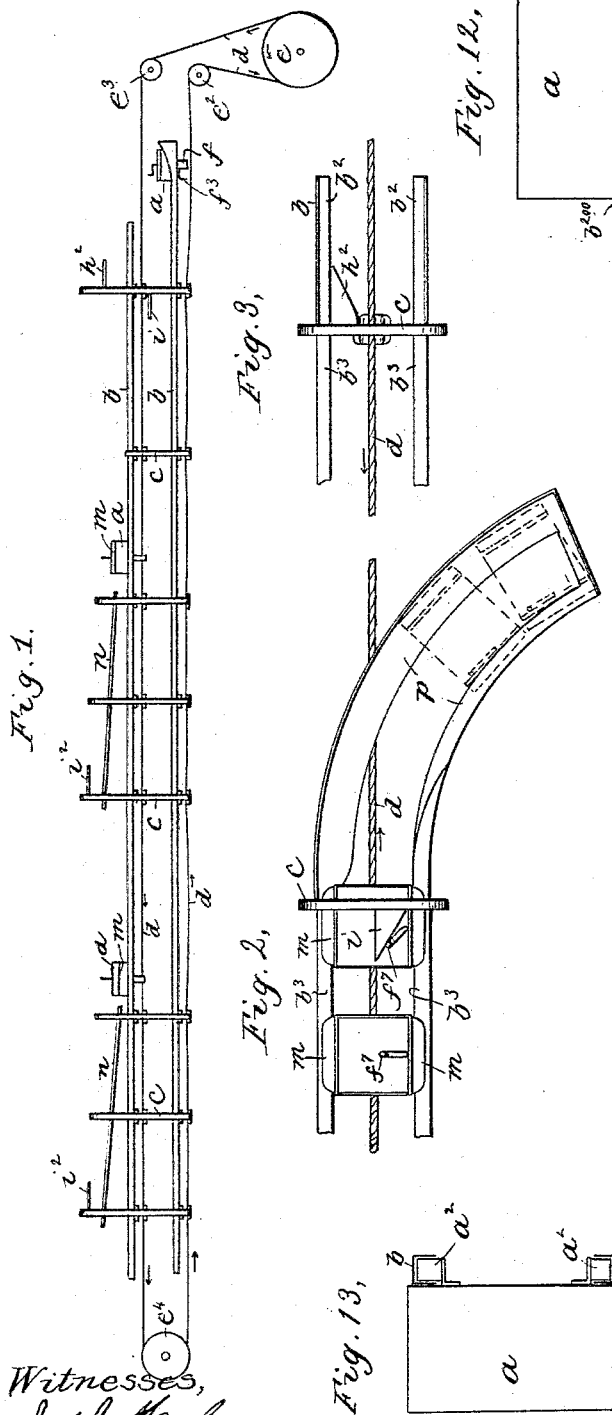
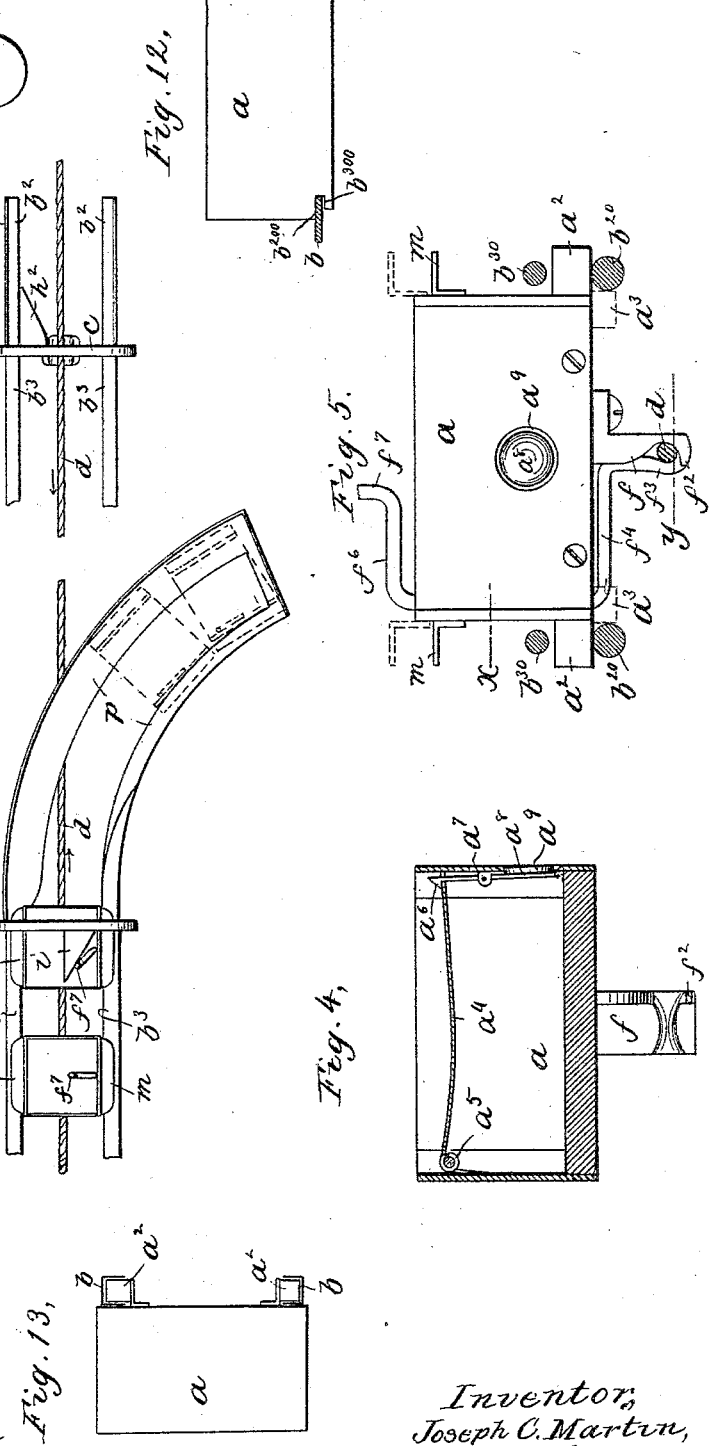
Witnesses,
Jas. J. Maloney
M. C. Hill
Inventor,
Joseph C. Martin,
by Jno. P. Livermore
Att'y.

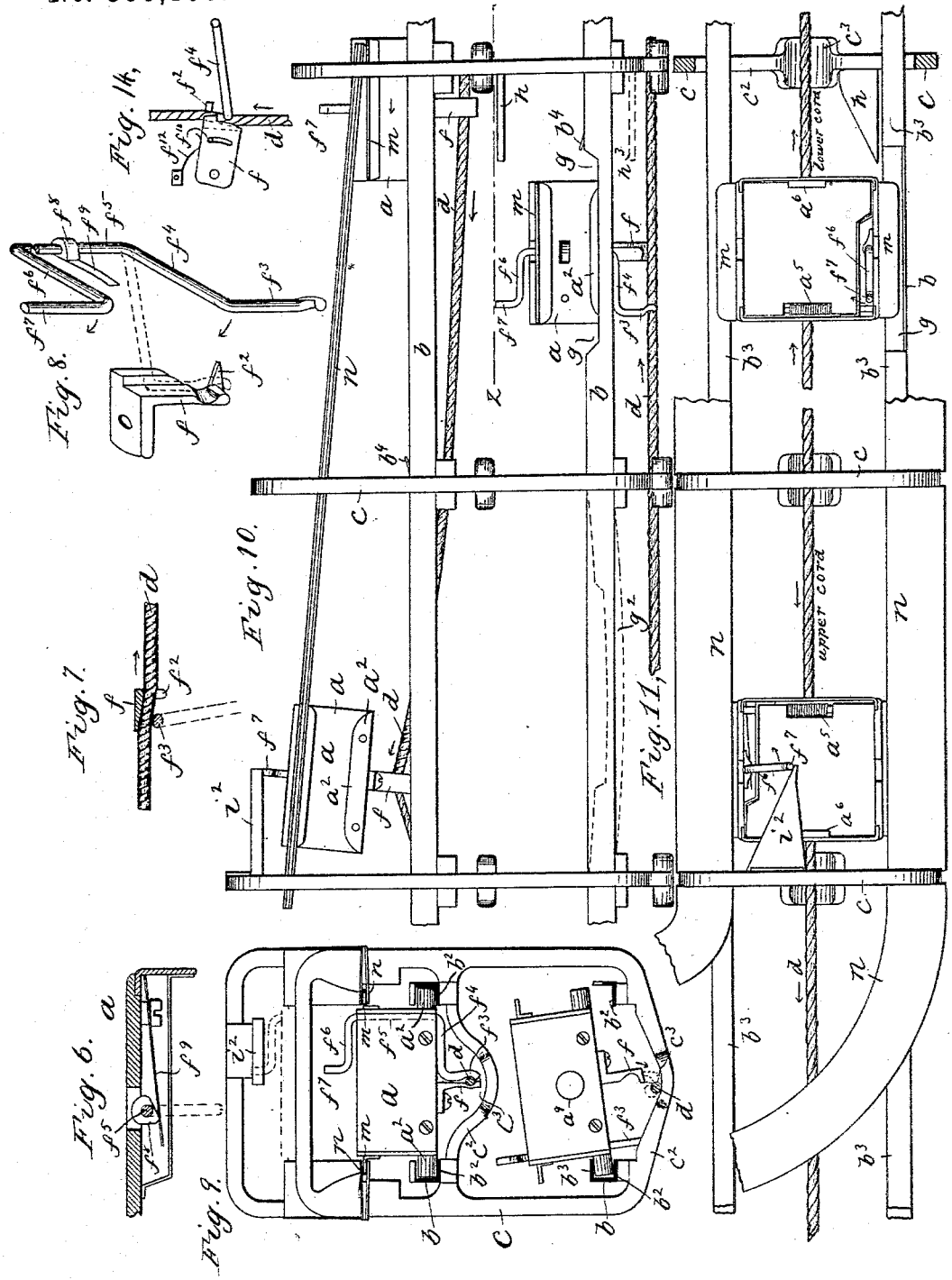

UNITED STATES PATENT OFFICE.

JOSEPH C. MARTIN, OF BURLINGTON, VERMONT.

CONVEYING APPARATUS.

SPECIFICATION forming part of Letters Patent No. 399,150, dated March 5, 1889.

Application filed October 19, 1888. Serial No. 288,558. (No model.)

*To all whom it may concern:*

Be it known that I, JOSEPH C. MARTIN, of Burlington, county of Chittenden, and State of Vermont, have invented an Improvement in Conveying Apparatus, of which the following description, in connection with the accompanying drawings, is a specification, like letters on the drawings representing like parts.

My invention relates to a conveying apparatus adapted for use in stores for carrying money back and forth between the cashier's desk and the stations at which the sales are made; but it is obvious that the apparatus may be employed for conveying other articles, if desired.

The invention is intended as an improvement in conveying apparatus of the kind in which the carriers or receptacles for the material to be conveyed are propelled in one direction on one track, which will be hereinafter called the "forwarding-track," and in the opposite direction on another track, which will be called the "return-track," by an endless propelling cord or belt, one portion of which travels in one direction to co-operate with the carriers on one track, while another portion adjacent to the other track and co-operating with the carriers thereon travels in the opposite direction during the continuous movement of the belt.

The invention further relates to apparatus of that kind in which a single line of track, comprising a forwarding and return track, extends from the cashier's desk through a number of different stations and the tracks and carriers are so constructed that a carrier forwarded from any given station is delivered automatically at the same station when returned from the cashier's desk.

None of the features thus far referred to are broadly new at the present day; and the present invention consists in specific combinations of parts and in details of construction and arrangement, which will be hereinafter referred to.

The features of novelty relate mainly to the construction of the track or guideway on which the carriers travel and to the parts of the carriers themselves that co-operate with said track; also, to the clutch or contrivance by which the carrier is connected with or gripped onto the cable, and to the appliances for operating the said clutch so that it may close automatically when the carrier is placed in the proper position on the track and may be opened or ungripped automatically after the carrier has been delivered from the track, and also to the appliances for delivering the carriers from the tracks at the stations.

Figure 1 is a side elevation representing a way or line of transportation comprising two tracks and appliances for propelling the carriers along the said tracks and delivering them therefrom at the proper points; Fig. 2, a plan view of the terminus of the forwarding-track at the cashier's desk or station, to which all the carriers are sent from the sales-counters or way-stations on the line; Fig. 3, a plan view of the terminus of the return-track at the cashier's desk or station, from which all the carriers are sent to be delivered at various points or way-stations on the return-track; Fig. 4, a longitudinal section of one of the carriers or traveling receptacles; Fig. 5, an end view thereof, showing a modification in the construction of the track; Fig. 6, a horizontal sectional detail on line $x$ of Fig. 5, showing a portion of the gripping device; Fig. 7, a sectional detail on line $y$, Fig. 5, illustrating the action of the gripping device in connection with the propelling-cord; Fig. 8, a perspective view of the members of the gripping device; Fig. 9, a transverse section of the track at one of the way-stations; Fig. 10, a side elevation of the track and appliances at one of the way-stations, and Fig. 11 a plan view thereof. Figs. 12 and 13 are modifications of the track and carrier, and Fig. 14 is a modification of the clutch, all of which will be more particularly hereinafter referred to.

Each way or line of transportation comprises two tracks, which are for the most part arranged one above the other and generally support the carrier mainly above the said tracks, although the tracks and carriers are so constructed that the carriers will be positively retained on the track whatever may be the position of one relative to the other, so that if required the tracks may be turned edgewise, or even inverted, from their most usual arrangement without danger of the carrier being thrown off, and the track may run in any direction, either horizontal or vertical, or at any desired inclination to the vertical. The terms "above" and "below," "top" and "bottom," &c., will, however, be used with reference to the tracks and carriers when in position with the tracks substantially horizontal and mainly below the carrier which then rests thereon.

The carriers $a$ (best shown in Figs. 4 and 5) are made in the form of rectangular boxes, having laterally-projecting ribs or flanges $a^2$ along the sides, near the bottom, and each member or rail or guideway of each track has two longitudinal members, one above and one below the said flanges $a^2$ of the carrier, so that the latter when once placed on and embraced by said track cannot be removed therefrom without removal of some portion of the track itself.

In the construction which is believed to be the most efficient each member, rail, or guideway of each track is composed of a channel-shaped strip, $b$, of sheet metal, the flanges or edges $b^2 b^3$ of which thus embrace between them the lateral flanges or projections $a^2$ of the carriers, as shown in Fig. 9, and each track comprises two such channel-rails, the open sides of which face one another, so as to receive the carrier between them.

In the modification shown in Fig. 5 each rail or member consists of two rods or wires, $b^{20} b^{30}$, corresponding to the flanges $b^2 b^3$ of the channel-shaped rails shown in the other figures, and embracing the flanges $a^2$ of the carrier in substantially the same manner. With this construction it is desirable that the carriers should have projections or flanges at the bottom, as indicated in dotted lines at $a^3$, to restrain the carrier from movement laterally at the points where the upper portions, $b^{30}$, of the track are removed to permit the carrier to be placed on or removed from the track, as will be described more fully later on. These channel-shaped rails $b$ are supported from point to point by brackets or frames $c$, having transverse members $c^2$, that are grooved or depressed, as shown at $c^3$, to support and guide the propelling-cord $d$, which is driven by a suitable motor, the driving-pulley of which is represented at $e$, Fig. 1, and is extended over suitable guide-pulleys, $e^2 e^3$, and along both tracks and over a pulley, $e^4$, at the extremity of the tracks remote from the motor-pulley $e$.

At the points or stations where the carriers are to be applied to and removed from the tracks one of the flanges, as $b^3$, of one or both members of the track will have to be removed; but between the stations both flanges $b^2 b^3$ are continuous, and consequently the carrier is positively retained on the track without reference to the action of gravity on the carrier; and in order that it may be propelled along the track the carrier is provided with a clutch or gripping device to take hold of the propelling-cord $d$, said clutch comprising a stationary jaw or member, $f$, consisting of an arm attached to and projecting downward from the bottom of the carrier, and preferably having near its end a recess that receives the cord and just below it a lateral projection or finger, $f^2$, that comes beneath the cord when the latter is gripped by the clutch. The other member, $f^3$, of the clutch consists of a projection or finger at the end of an arm, $f^4$, from a rock-shaft, $f^5$, turning in the side of the box and provided with a corresponding arm, $f^6$, and finger $f^7$ above the box. The rock-shaft is provided with a cam projection, $f^8$, that is acted upon by a spring, $f^9$, (see Fig. 6,) and tends to hold the rock-shaft in either one of two positions about a quarter-turn apart, in one of which positions the member $f^3$ is close to the member $f$ and grips the cord, as shown on the upper track in Fig. 9, and in the other of which positions the arm $f^3$ is remote from the member $f$, so that the cord would run freely by the latter, and in turning from the position remote from the cord or near the side of the carrier toward the middle of the carrier and stationary member $f$ the member $f^3$ would engage the cord and press it against the member $f$.

The recess in the member $f$ for the cord is preferably made tapering, as shown in Figs. 7 and 8, and the swinging movement of the member $f^3$ is toward the tapering surface, and the carrier is applied so that the cord $d$ runs in the direction that the member $f^3$ moves in closing, so that the pull of the cord tends to tighten the grip thereon, as clearly shown in Fig. 7.

At the way-stations the lower or forwarding track may be made, as shown in Figs. 9 to 11, with a portion of the upper flange, $b^3$, of one only of the rails removed, as shown at $g$, thus permitting the carrier to be placed on the track, as will be readily understood from Fig. 9, by first inserting one flange $a^2$ of the carrier into the complete channel or rail at one side of the track, and then dropping the other flange $a^2$ of the carrier through the space where the upper flange, $b^3$, is removed on the other rail; or, if desired, the upper flanges, $b^3$, may be removed over a short space on both rails of the track and the carrier dropped vertically downward.

At the points where the carrier is to be applied to the track the guide $c^3$ for the propelling-cord is thrown slightly to one side of the middle of the track, so that the member $f$ of the clutch will always come with its finger $f^2$ toward the cord, or, in other words, with the cord on the same side of the member $f$ as the member $f^2$, so that as the said member $f^3$ swings around toward the member $f$ it will engage the cord. The cord-guides $c^3$ on the brackets must be low enough to permit the clutch to pass over them without striking, and consequently the finger $f^2$ must come below the middle of the cord when the latter is resting on the guide $c^2$ if the clutch is to be closed when the carrier is immediately over one of the cord-guides, as shown in Fig. 9 and at the right-hand part of Fig. 10; but it may in some cases be desirable to adopt the construction shown in dotted lines in the left-hand part of Fig. 10, which consists in depressing the track, as indicated in dotted lines at $g^2$, between two of the adjacent supporting-frames $c$, so that the cord, which will run nearly straight from one to the other of said frames, will be nearer to the bottom of the carrier when on said depressed portion than when the carrier is directly over one of the cord-guides in the frame, or, in other words, the depression of the track will bring the cord member low enough to engage the cord, and the rise of the track from said depressed portion to the next track-supporting frame will be sufficient to carry the clutch with the cord engaged by it over the cord-guide of said frame.

I do not claim in this application the feature just described—viz., the combination, with the propelling-cord, cord-supports, and carriers provided with a cord-engaging clutch, of a main track depressed with relation to the cord at points where the carrier is applied to the track, whereby the cord-engaging portion of the clutch is brought opposite to or in line with and in a position to engage the cord. This feature is the subject of another application in my name for Letters Patent, Serial No. 298,391, filed February 1, 1889, as a division of my present application.

After the carrier has thus been placed on the track at a point where the removal of a portion of the flange $b^3$ permits it, as just stated, the grip may be closed on the cord by pressing the finger or clutch-operating handle $f^7$ inward by hand; or, if desired, a cam, $h$, may be employed, which, when the carrier is pushed by the operator in the same direction that the propelling-cord is moving, will engage the finger $f^7$ and turn the rock-shaft $f^5$ in the direction to close the member $f^3$ upon the cord, so that the operator has merely to place the carrier on the track and then give it a slight push along in the direction in which it is to go, when the clutch will be closed automatically and the carrier thus gripped by the cord, which will carry it on until it is in some way arrested or turned from the track or disengaged from the cable.

It should be stated that the clutches are of exactly the same construction, and all the parts of the clutches and their handles are in the same position with relation to the carrier on all the carriers used on a given line of track, so that the cams for operating the said clutches either to grip or ungrip are the same and are in the same position with relation to the track at all stations.

When the carriers have been placed on the lower or forwarding track and connected with the propelling-cord at any station, as just described, they will be carried on until they arrive at the cashier's desk or terminal station, where they will be disconnected from the propelling-cord, and thus brought to rest or delivered from the track by the following devices, (shown in Figs. 1 and 2:)

At the end of the forwarding-track there is supported above the track on one of the frame-pieces a cam or wedge, $i$, which, as the carrier arrives, engages the finger or operating-handle $f^7$ of the clutch and turns the same in the direction to move the member $f^3$ from the member $f$, thus disconnecting the carrier from the propelling-cord, so that the carrier continues to move only by the momentum which it has previously acquired. Beyond the point where the carriers are thus disconnected the upper flanges, $b^3$, are removed and the carrier is supported and guided only by the surface below and at the sides of the flanges $a^2$ of the carriers, and the said surfaces may, if desired, be turned off or curved to one side, as shown in Fig. 2, for greater convenience.

The movement of the carrier may be arrested either by its momentum being overcome by friction or by any suitable barrier, and the carriers may be picked up as soon as the operator is ready for them. The portion of the propelling-cord between the releasing-cam $i$ and supporting-pulley $e^2$ (see Fig. 1) may be depressed, so that after the cord has been once released there will be no danger of either part of the clutch coming in contact with it while the carriers are on the terminal-station platform or support $p$. (Shown in Fig. 2.) After the proper change or transfer in the contents of the carriers has been made they are placed by the operator at the terminal station upon the return-track, which may be constructed at its end, as shown in Fig. 3, substantially like the forwarding-track at the way-station before described—that is, with the upper flanges removed, so that the carrier may be set down upon the track—after which the grip may be closed by the operator turning the handle $f^6$, or by means of a cam, $h^2$, similar in its operation to the cam $h$, before described, at the way-station. The cams $h^2$ and $h$ might be below the carrier and act on the finger $f^3$ of the movable clutch member, as shown in dotted lines at $h^3$, Fig. 10. As the return-track begins at the terminal station, it is not necessary that the flanges $b^3$ of its rails should be removed, as the carrier might be placed on the track by inserting its flanges $a^2$ endwise into the channel-shaped rails; but it is believed to be more convenient to remove the flanges, so that the carrier may be set down more quickly upon the track with less care upon the part of the operator.

The track may be slightly lower with relation to the propelling-cord at the point where the carriers are put on and connected with it, as just described, than where the cord passes over its supporting-guides $c^3$ between stations, as has been already explained, as the cord-supporting pulley $e^3$ may be raised above the general level of the cord-guides, as the clutches do not have to pass over this pulley $e^3$. The carriers are then propelled along the return-track, and each carrier is removed from the track or delivered from the station to which it belongs by the following devices, (best shown in Figs. 9, 10, and 11.)

Each carrier, in addition to the flanges $a^2$, that co-operate with the main tracks $b$, has also upon each side two thin laterally-projecting longitudinal flanges, $m$, which co-operate with a short auxiliary or delivering track, $n$, at each station, which is placed above the main rails $b$ of the return-track, as clearly shown in Fig. 10. Thus, if on arriving at a given station the flanges $m$ of the carrier are at the same height above the main track as the lower ends of the delivering-track $n$, the said flanges will engage the said track $n$ and the carrier will run up the said inclined track, being lifted off the main track, which has its upper flanges, $b^3$, removed for a short distance from the lower end of the auxiliary track $n$, as shown in Fig. 9, so that the main guiding-flanges $a^2$ of the carrier do not interfere with its upward movement from the main track. After the carrier has thus been raised by the auxiliary or delivering track $n$ a sufficient distance to wholly clear it from the main track $b$, and as much higher as may be desired, the operating-handle $f^7$ of the clutch is engaged by a cam, $i^2$, which swings the said handle and the connected movable member $f^3$ of the clutch around to the position shown in full lines, Fig. 8, thus releasing the cord from the clutch in substantially the same manner as the cam $i$ at the terminal station on the forwarding-track, as before described. The box will then continue its movement by its momentum, and the auxiliary or delivering track may be curved to one side, as shown in Fig. 11, or carried on to a higher point, so that the carrier that has been thus delivered from the main track or automatically side-tracked, as it were, is removed beyond the path of other carriers that may come along the main track. The curvature is exaggerated in Fig. 11, or sharper than it would be made in practice.

The auxiliary track may consist merely of two strips—one at each side of the carrier—that engage the under sides of the flanges $m$; but they will be preferably made, as shown, of two pairs of strips, each pair having a sufficient space between them to receive the flanges $m$, as by having said flanges engaged above and below the carrier will be more positively and securely guided and held while on the delivering-track. The latter may be continued far enough to arrest the carrier by friction, after which the carrier may be positively pulled out from the end of the delivering-track by the operator; or it may run wholly out from the end of the delivering-track by its momentum and drop upon any suitable support or into any suitable receptacle.

The flanges $m$ of carriers belonging to different stations are at different heights above the flanges $a^2$, and the lower ends of the delivering-tracks are also at different heights above the main track, so that all carriers having flanges at one given height will be delivered at the one station where the lower end of the delivering-track is at the same height.

The station nearest the point at which all the carriers are applied to the return-track must have the auxiliary track, and the corresponding carriers must have the flanges $m$ at the highest level above the main track, and each succeeding station must have the lower end of the auxiliary track at a lower level relative to the main track than the lower end of the auxiliary tracks at all preceding stations, so that any given carrier will be carried along the main track, and its flange $m$ will pass below the auxiliary track of all stations before the one at which the said given carrier is to be delivered. A delivering-track of this kind might be employed as a switch to take all the carriers having flanges $m$ at a certain height from one main track, disconnect them from the propelling-cord thereon, and deliver them onto another line of track, and the carriers thus delivered might have other flanges below the one by which they were thus switched off to deliver them at different points on the branch track upon which they were thus deposited.

The flanges $a^2$ of the carriers may be of vulcanite or similar material, which will run along metallic rails with but little noise or friction, while the flanges $m$, which operate only for a short distance, may be of metal, and, being thin, admit of a considerable number being spaced at different heights above the main flanges to co-operate with the different delivery-tracks, and the flanges $m$ may, if desired, be placed above the top of the main portion of the box, as indicated in dotted lines, Fig. 5.

The carrier-boxes are provided with covers $a^4$, (see Fig. 4,) having a spring-hinge, $a^5$, that tends to open them, they being kept closed by a spring catch or clasp, $a^6$, shown as pivoted at $a^7$ on the inside of the end of the box, and having a handle portion, $a^8$, that can be reached by the finger of the operator through an opening, $a^9$, in the end of the box. The arm $f^6$, that carries the operating-handle $f^7$ of the clutch, is so placed, as shown, that the cover $a^4$ can be opened and closed only when the clutch is in its open position, the said arm $f^6$ projecting out over the cover when the clutch is closed, as shown on the upper track in Fig. 9.

The invention is not limited to the exact construction shown and described, as it is obvious that modifications may be made that would be substantial equivalents to the devices shown. As an example of such an equivalent, the two rails of the main track might each consist of a single strip and work in a channel-shaped guide on the carrier, as illustrated in Fig. 12, the said channel-shaped guide either projecting out from the side of the carrier, as shown at the right hand in Fig.

12, or being recessed into the side of the carrier, as shown at the left hand. Such construction is a mere inversion of that illustrated in the other figures, and as such is regarded as a mechanical equivalent of the preferred form illustrated in the other figures, the essential feature in the construction of the track in all cases being that each rail or guide member has two guiding-surfaces, one engaging the carrier from below and the other from above.

In the construction shown in Fig. 12 the guide-surface $b^{200}$, that engages the upper part of the groove on the carrier and supports the same against downward pressure, corresponds to the surface $b^{20}$, illustrated in Fig. 5, or $b^2$ in the other figures, and the surface $b^{300}$, that engages the under side of the groove or channel on the carrier, preventing upward movement thereof, corresponds to the guide-surfaces $b^{30}$ in Fig. 5 and $b^3$ in the other figures. In this construction the under side of the groove on the carrier may be narrower than the upper, as shown, and a corresponding portion of the width of the main track may be removed at the places where the carriers are to be applied and removed, the part at the upper side of the groove on the carrier and the corresponding part of the track that overhangs or is at the outside of the lower part of the groove then supporting the carrier against downward pressure, while there is nothing to prevent it from being lifted up from the track or set down thereon.

By having the auxiliary or delivering tracks $n$ inclined upward, as shown, the carriers may be delivered finally at either side of the track, as preferred, and each carrier is acted upon only by the one auxiliary track at the one station to which it belongs.

The flanges $a^2$ of the carrier are rounded on the upper sides at their ends, as shown, so as to enter readily under the flanges $b^3$ or guiding-surfaces of the main track as the carriers move along the same, and the said upper flanges may be slightly inclined upward where the carriers enter under them, as shown at $b^4$, Fig. 10.

It is not necessary that the flanges $a^2$ or equivalent devices should be at the sides of the box. They might, instead, be below the bottom of the box, as shown in Fig. 13, in which the track and carrier are also shown as turned up edgewise. This construction, however, has the same essential characteristics as the others referred to—namely, that the guiding portions of the carrier are between the rails, and are so embraced or engaged by the rails as to positively retain the carrier upon the track in all positions, so that the carriers may have no movement relative to the track except directly along the same.

The clutch member $f$ has been spoken of as the stationary member, for the reason that it has no appreciable movement toward the cord and constitutes merely a support or abutment against which the cord is pressed by the other member, which moves toward and from the cord in order to grip and release the same. It is not essential, however, that the member $f$ should be absolutely fixed or stationary upon the box, and it may in some cases be desirable to pivot the said member $f$, as indicated in Fig. 14, so that its cord-engaging recess will have a slight movement mainly in the direction of the movement of the cord, such movement of the member $f$ being limited by the pin $f^{10}$, and the said member being acted upon by the spring $f^{12}$, tending to move it in the opposite direction to that in which the said cord is traveling. By this construction the member $f$ remains stationary in the position shown until the movable member $f^3$ has engaged the cord and pressed it against the stationary member, or, in other words, has gripped the cord, after which the said gripping action may be slightly increased by the pull of the cord tending to move both members of the clutch in the same direction that the cord is moving, and thus drawing the said members somewhat closer together, owing to the fact that the point at which they press upon the cord is slightly to one side of the line that joins the axes of the two clutch members. This movement of the member $f$, however, has nothing to do with the primary gripping or ungripping of the cord, which is effected wholly by the movement of the member $f^3$.

I claim—

1. The combination of the main track, a propelling-cord moved parallel thereto, an auxiliary or delivering track inclined to the line of the main track, the carrier supported and guided on the main track and provided with flanges distinct and separate from those of its parts which engage the main track, and which are adapted to engage said auxiliary track and to support and guide it thereon, a cord-engaging clutch attached to the carrier, and a clutch-tripper arranged and operating to release the clutch from the cord after the carrier has left the main track and has traveled a predetermined distance on the auxiliary track, substantially as and for the purpose, hereinbefore set forth.

2. The combination of the carrier with a main track composed of two opposite rails, each having upper and under guide-surfaces that engage corresponding guide-surfaces on the carrier above and below, portions of one of said rail-guide surfaces being removed at stations or points on the track where the carrier is to be applied thereto and removed therefrom to permit the carrier to be lowered onto and raised up from the said track, the remaining portion of said rail-guide surfaces at such points serving to support and guide the carrier, substantially as described.

3. The combination of the carrier, a main track composed of two opposite rails, each having upper and under guide-surfaces that engage corresponding guide-surfaces on the carrier above and below, portions of one of said rail-guide surfaces being removed at the station or point on the track where the carrier is to be removed therefrom, and an auxiliary or delivering track at said station, inclined to the line of the main track, composed of two opposite rails adapted to engage lateral longitudinal flanges on the said carrier distinct from those parts of the carrier which engage the main track, substantially as and for the purposes hereinbefore set forth.

4. The combination of a track and propelling-cord moved parallel thereto, with carriers movable on said track, provided with a cord-engaging clutch composed of a cord-receiving member consisting of an arm attached to the carrier, and a movable member consisting of a finger supported on an arm connected with the rock-shaft, and a cam on said rock-shaft and spring co-operating therewith to retain the said clutch in its open and closed positions, substantially as described.

5. The combination of the main track and the propelling-cord moving substantially parallel therewith, with the carrier moving on said track, provided with a cord-engaging clutch having a cord-receiving member consisting of an arm attached to the body of the carrier and provided at its extremity with a laterally-projecting finger, and a member movable toward and from said cord-receiving member in an arc substantially tangential to the line of movement of said cord, substantially as set forth.

6. The combination of the main track and propelling-cord moving substantially parallel therewith, with a carrier movable on said track, provided with a cord-engaging clutch having a cord-receiving member consisting of an arm attached to the body of the carrier and provided near its extremity with an inclined cord-engaging recess, and a member movable toward and from said cord-receiving member in an arc substantially tangential to the movement of said cord, substantially as set forth.

In testimony whereof I have signed my name to this specification in the presence of two subscribing witnesses.

JOSEPH C. MARTIN.

Witnesses:
JOS. P. LIVERMORE,
M. E. HILL.